(No Model.) 4 Sheets—Sheet 1.
J. H. BASSLER.
ELECTRIC WELDING APPARATUS.

No. 498,735. Patented May 30, 1893.

(No Model.) 4 Sheets—Sheet 2.

J. H. BASSLER.
ELECTRIC WELDING APPARATUS.

No. 498,735. Patented May 30, 1893.

Witnesses.
J. H. Emmel
J. F. Coleman

Inventor
John H Bassler
By
Wm Hunter Myers.
Atty.

(No Model.) 4 Sheets—Sheet 3.
J. H. BASSLER.
ELECTRIC WELDING APPARATUS.
No. 498,735. Patented May 30, 1893.
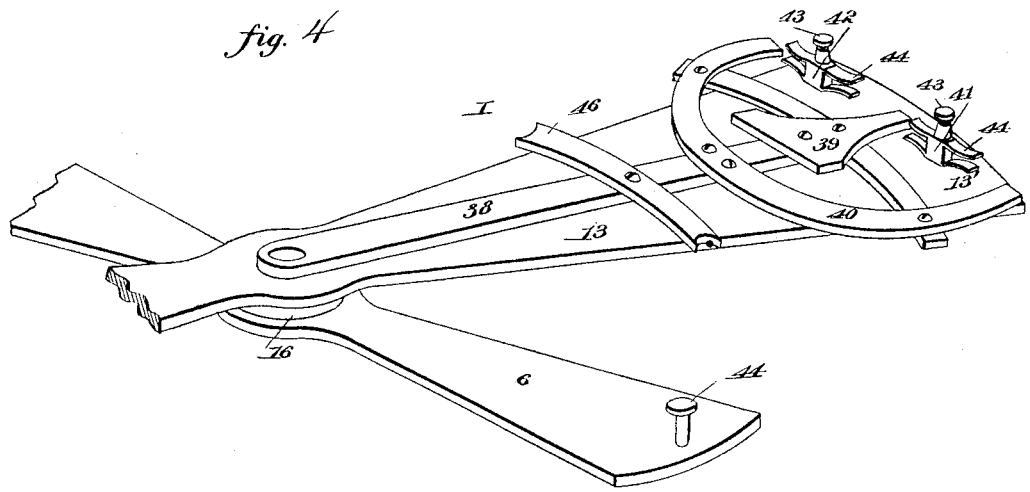
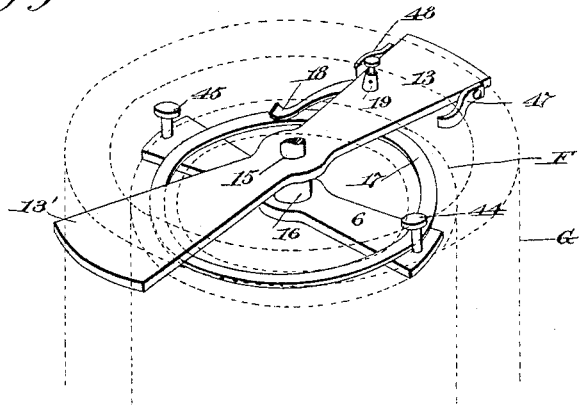
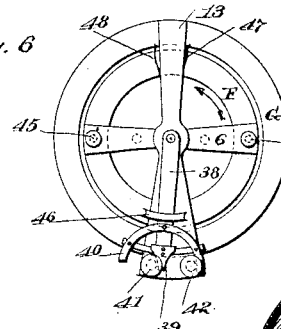
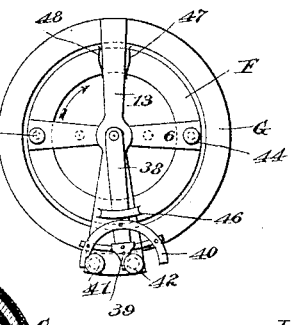
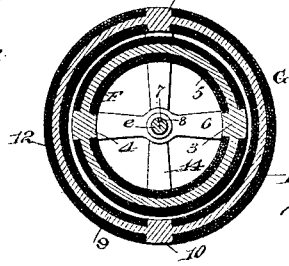
Witnesses: Inventor
John H Bassler
By
W Hunter Myers
Att'y.

(No Model.)  4 Sheets—Sheet 4.

J. H. BASSLER.
ELECTRIC WELDING APPARATUS.

No. 498,735.  Patented May 30, 1893.

Witnesses.
J. F. Coleman
G. H. Immel

Inventor
John H Bassler
By
W. Hunter Myers
Att'y.

UNITED STATES PATENT OFFICE.

JOHN H. BASSLER, OF MYERSTOWN, PENNSYLVANIA.

ELECTRIC WELDING APPARATUS.

SPECIFICATION forming part of Letters Patent No. 498,735, dated May 30, 1893.

Application filed August 23, 1892. Serial No. 443,888. (No model.)

*To all whom it may concern:*

Be it known that I, JOHN H. BASSLER, a citizen of the United States of America, residing at Myerstown, in the county of Lebanon and State of Pennsylvania, have invented certain new and useful Improvements in Electric Welding Apparatus, of which the following is a specification, reference being had therein to the accompanying drawings.

My invention relates to electric welding apparatus, and particularly to that class of apparatus in which a current of high tension is used to produce an electric arc which furnishes the welding heat.

The object of my invention is the production of an apparatus which will manipulate the electric arc in such a manner as to avoid all danger of burning the metal while welding it, and which will be simple in construction and easily operated.

My invention consists, broadly, in an arc electric welding apparatus having reciprocating and oscillating electrodes; and it consists, further, in such details of construction as will first be described in connection with the accompanying drawings and then pointed out in the claims.

Figure 1:
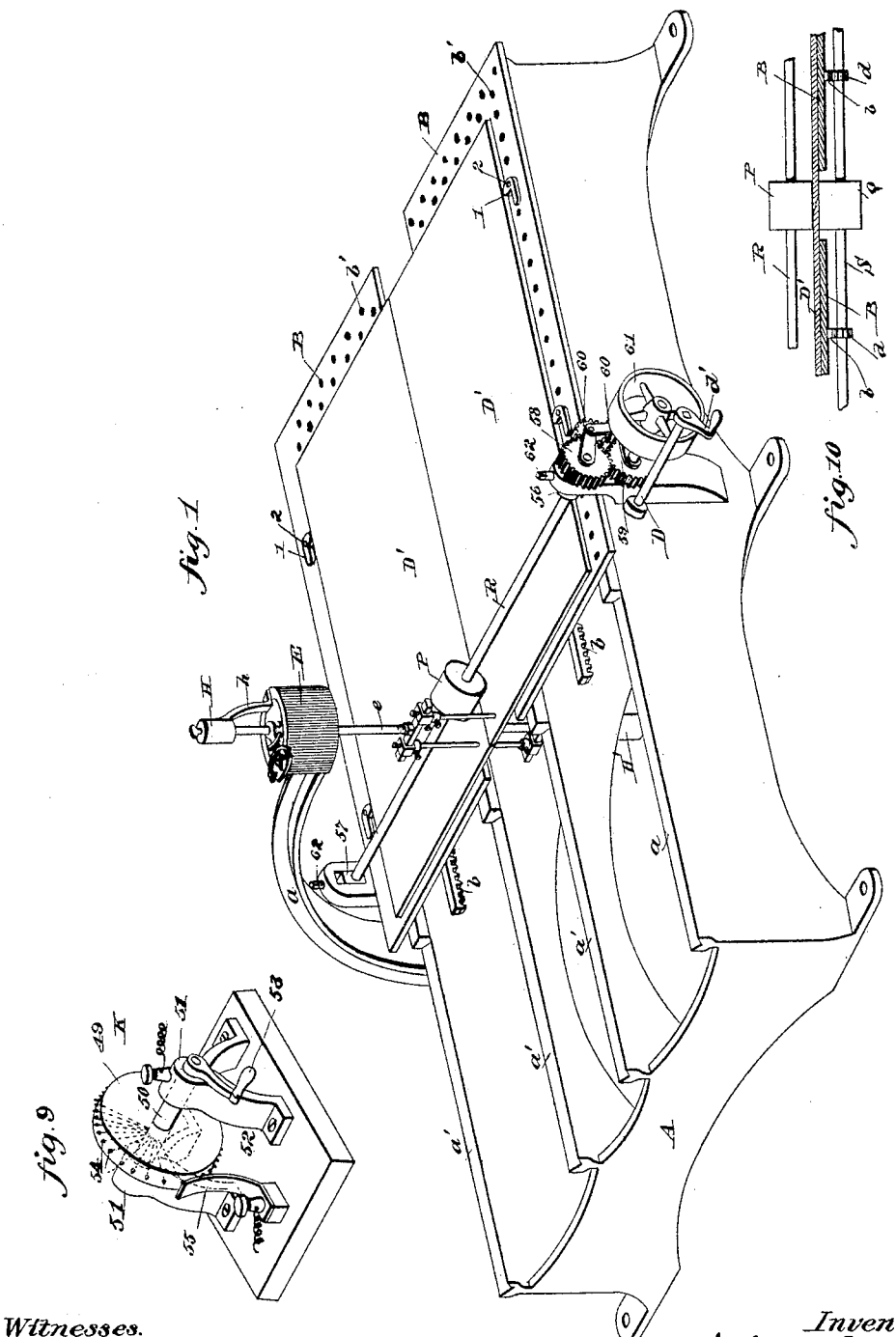
Figure 2:
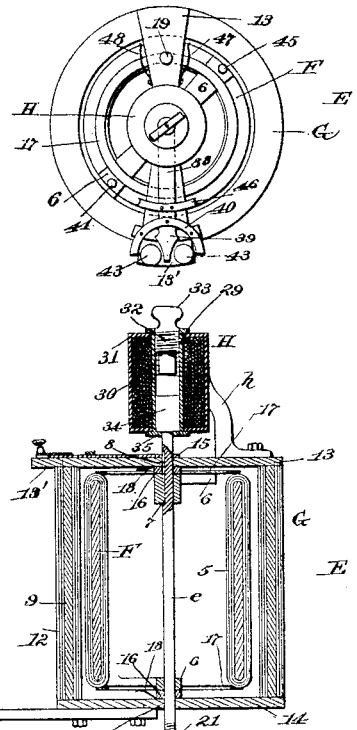
Figure 3:
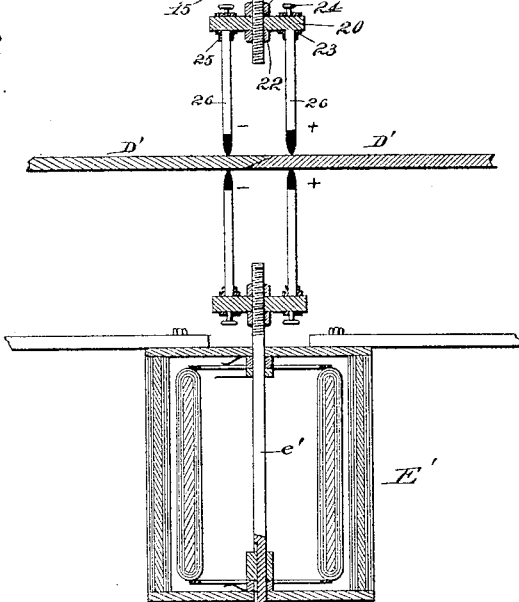
Figure 11:
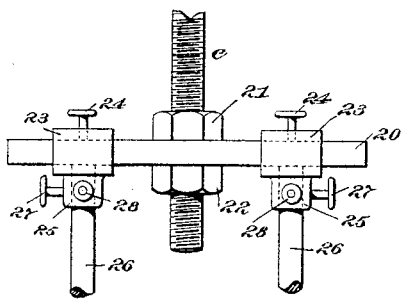
Figure 12:
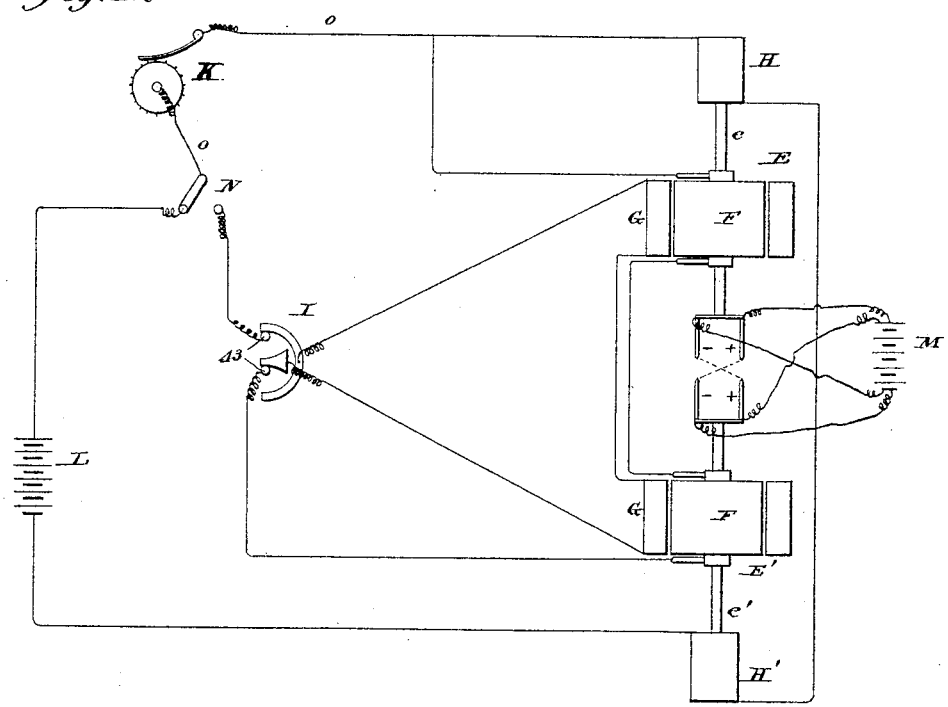

In the drawings Figure 1 is a perspective view of the complete apparatus. Fig. 2 is a plan view of the motors and electro-magnets. Fig. 3 is a vertical section of the motors and electro-magnets, taken through the center of Fig. 2. Fig. 4 is a detail perspective view of the current-reverser. Fig. 5 is a perspective view of the upper end of the top motor. Figs. 6 and 7 are plan views of the motor and current-reverser, showing the latter in its two positions. Fig. 8 is a horizontal section of one of the motors. Fig. 9 is a perspective view of the circuit-breaker. Fig. 10 is a detail view of the feed-roll. Fig. 11 is a detail view of the electrode-holders. Fig. 12 is a diagrammatic view showing the wiring of the apparatus.

Referring to the drawings, A is a framework consisting of an upright arm $a$ and V-shaped ways $a'$, on which slide the beds or tables B, moved synchronously by means of racks $b$ secured to the under side of the beds, with which engage pinions $d$ on a shaft D journaled in the framework and provided with a crank $d'$. The material to be welded, D', is secured to the beds by cams 1 pivoted on bolts 2 passing through holes $b'$ in the beds.

The arm $a$ carries at its upper end a motor E adapted to rotate its armature-shaft $e$ nearly half a revolution in one direction and then back again in the other direction. This motor is provided with a hollow cylindrical armature-core F, having two poles 3 and 4, between which the armature-coils 5 are wound vertically. The armature is secured to the shaft by means of chord-pieces 6, through the center of which the shaft loosely passes. To permit a vertical reciprocation of the shaft independent of the armature for a purpose hereinafter described, the chord-pieces 6 are provided with feathers 7, engaging a slot 8 in the shaft.

Surrounding the armature is the field-magnet G, consisting of a hollow cylindrical ring 9, having poles 10 and 11, between which the field-magnet coils 12 are wound vertically and parallel to the armature coils. The field-magnet ring is provided with chord-pieces 13 and 14, having bearings 15, in which the armature-shaft revolves. Chord-piece 13 is extended at one end as shown at 13' for a purpose hereinafter described. Between the chord-pieces of the armature and those of the field-magnet are placed collars 16, loose upon the shaft and serving to prevent vertical movement of the armature. Secured to the armature chord-pieces 6 and insulated therefrom are contact-rings 17, against which press springs 18, secured to and insulated from the field-magnet chord-pieces 13 and 14, and in connection with binding-posts 19, which are also insulated from the chord-pieces. One end of the armature-coil is connected with one contact-ring and the other end with the other contact-ring.

Near the lower end of the armature-shaft is a cross-bar 20, of insulating material, through which the shaft passes, the shaft being threaded above and below the cross-bar for the reception of nuts 21 and 22, by means of which the cross-bar may be adjusted on the shaft. To this cross-bar are attached slides 23, having clamping-screws 24 and electrode-holders 25, in which latter are secured electrodes 26 by means of thumb-screws 27. Binding posts 28 are attached to the electrode-holders so as to be in electrical communication with the electrodes.

Above the motor is an electro-magnet H, having a central tube 29, surrounded by coils 30, outside of which is a casing 31 carried by a support *h* mounted on the upper chord-piece 13 of the field-magnet ring. Within the upper portion of the central tube is screwed a plug 32 having a thumb-piece 33 for adjusting it up or down in the tube. In the lower portion of the tube is a vertically-movable core 34 attached to the upper end of the armature-shaft *e*. To limit the downward movement of the armature-shaft the movable core 34 is made larger in diameter than the shaft *e* and the lower end of the central tube 29 is flanged as shown at 35. The upward movement of the shaft is limited by the plug 32.

To the lower part of the framework A, beneath the tables or beds *b*, is secured a motor E' similar in construction to the upper motor E, but inverted, as shown, and having an inverted electro-magnet H' at its lower end, similar in construction to the upper electro-magnet H. The lower armature-shaft *e'* is provided with a pin 36, against which bears a spring 37 resting on top of the flange 35 of the central tube 29, and tending to keep the lower armature-shaft *e'* normally raised. The lower electro-magnet H' is carried by supports *h'*, as shown.

I is a current-reverser attached to the upper motor, and consisting of an arm 38, of insulating material, which swings loosely on the armature shaft *e* just above the chord-piece 13, and has a contact-plate 39 and a contact-arc 40 secured to its outer end. To the extended end 13' of chord-piece 13 and insulated therefrom are attached contact-posts 41 and 42, provided with binding posts 43 and spring-jaws 44 as shown. These contact-posts are so located that when the arc 40 is in contact with the outer jaws of post 41, the contact-plate 39 will engage with the jaws of the other post 42, and vice versa, as clearly shown in Figs. 6 and 7.

To the upper armature chord-piece 6 are secured two pins 44 and 45, one at each end, which alternately engage a segment 46, of insulating material, attached to the arm 38, whereby the arm is vibrated from side to side when the motor E is in operation.

Springs 47 and 48 are secured to the edges of chord-piece 13 for engagement with pins 41 and 45, respectively, to aid in overcoming the inertia of the armature as it changes from one phase of its oscillation to another.

K is a circuit-breaker, consisting of a wheel 49, mounted on a shaft 50 journaled at 51 in a stand 52 and provided with a crank 53. On the periphery of the wheel are contact-points 54 in electrical communication with one journal 51 through the shaft 50. A spring 55 is adapted to press upon the periphery of the wheel, as shown.

L is a battery or other source of electricity for the purpose of actuating the motors and electro-magnets.

M is a battery or other source of electricity for furnishing the welding current to the electrodes.

The wiring of my apparatus is clearly shown in Fig. 12, where the motor battery L, the electro-magnets, and the armature coils are all in series with each other on a constant current circuit which ends at the binding-posts 43 of the current-reverser. The field-magnet coils are in series with each other and in circuit with the current-reverser, by means of which the current is alternated through the field-magnet coils.

N is a switch which is adapted to open the armature and field-magnet circuit and close the electro-magnet circuit through a shunt circuit O, in which the circuit-breaker K is included, the spring forming one pole and the journal 51 the other pole.

The electrodes are coupled in pairs, consisting of an upper and a lower electrode, each pair being in multiple arc with the other pair and both pairs in series with the battery M or other source of electricity. A short distance ahead of the electrodes are located a pair of rolls P and Q, one above the beds and one below the top of the beds and occupying the space between their edges, as seen in Fig. 10. These rolls are mounted in shafts R and S journaled in the framework at 56 and 57, and provided with gear wheels 58 and 59 intermeshing with idler wheels 60. The lower shaft S is extended beyond the gear-pinion 59 in order to receive a band-wheel 61 for driving the rolls. The journals of the upper shaft are adjustable by means of screws 62 adapted to be turned by a wrench.

The operation of my machine is as follows: The material to be welded is placed edge to edge, clamped to the beds by cams 1 and brought beneath the electrodes at the point to be welded. The welding current is turned on and the circuits established through the material. The motor current is then applied, thereby actuating the electro-magnets, drawing the electrodes away from the material, and forming two arcs, which cross each other through the joint of the material. At the same time that the electro-magnets are energized the motors are started, and, as the lower one is inverted, the lower electrodes move in an opposite direction to the upper ones. At the moment that like poles of the electrodes come opposite, the current-reverser is thrown, which first breaks the circuit, permitting the electrodes to drop onto the metal, and then reverses the current through the field-magnet coils, moving the armatures in the opposite direction until like electrodes again come opposite, when the operation is repeated. In this way the electrodes are alternately oscillated and reciprocated, so that the arcs are alternately moved about on the material and then interrupted, thereby preventing the too rapid concentration of the heat at one point and the consequent burning of the material. Furthermore, by reciprocating the electrodes the establishment of the arcs is insured. It is apparent that at the time when the upper positive electrode is directly over the lower negative electrode, and the arc therefore the shortest, the said electrodes are moving, or vibrating, rapidly in opposite directions, thereby distributing the heat so that the material will not be burned; while at the time when the electrodes are stationary the distance between each positive electrode and its opposite negative electrode is greatest and the arcs therefore longer and less liable to burn the material. And as at the moment the electrodes stop to change their phases of vibration or oscillation the carbons are dropped onto the material, the arcs are thereby extinguished and all danger of burning avoided, the arcs not being restored until the electrodes again begin to vibrate or oscillate, the material being prevented from cooling during the non-existence of the arcs by the heating effect of the current which is then flowing directly through the material. The specific kind of vibration which I have shown in this apparatus is an oscillation about centers; but this vibration, which is in a direction at right angles to the lengths of the carbons, might be produced by a sliding or other motion. As in some kinds of work it is impossible to oscillate the electrodes, it then becomes necessary to rely entirely upon the reciprocation of the electrodes to prevent burning of the material. By throwing the switch N the motors are cut out and the shunt circuit O and circuit-breaker K cut in. By turning the wheel of the circuit-breaker the electro-magnets H and H' are alternately magnetized and demagnetized, thereby reciprocating the electrodes without oscillating them. As the metal is heated to the welding point it is fed beneath the rolls P and Q, which compress the material at the joint, thereby kneading it together.

Having thus fully described my invention, what I claim as new, and desire to secure by Letters Patent, is—

1. In an electric welding apparatus, an electric circuit, means for energizing the same, and a pair of electrodes vibrating in a direction at right angles to their lengths and included in the circuit.

2. In an electric welding apparatus, an electric circuit, means for energizing the same, and a pair of reciprocating electrodes, vibrating in a direction at right angles to their lengths and included in the circuit.

3. In an electric welding apparatus, an electric circuit, means for energizing the same, mechanism for holding the material to be welded, a pair of electrodes included in the circuit, a shaft attached to each electrode, and means for oscillating the shafts.

4. In an electric welding apparatus, an electric circuit, means for energizing the same, mechanism for holding the material to be welded, a pair of electrodes included in the circuit, a shaft attached to each electrode, means for reciprocating the shafts, and mechanism for giving each electrode an oscillating motion, substantially as described.

5. In an electric welding apparatus, a pair of electro-motors having their shafts adapted to reciprocate, a pair of movable cores, each attached to one end of each shaft, electrodes carried by the motor shafts, a pair of electro-magnets for actuating the movable cores, a welding circuit in which is included the electrodes, means for energizing the same, a motor circuit in which the field magnets, the armatures, and the electro-magnets are included, means for energizing the same, a current-reverser intercepting the circuit to alternate the current to the field magnets, a shunt circuit, a circuit-breaker included therein, and a switch adapted to cut out the motors from the circuit and throw in the shunt circuit, substantially as described and for the purpose set forth.

In testimony whereof I affix my signature in presence of two witnesses.

JOHN H. BASSLER.

Witnesses:
J. H. WEIVICK,
J. H. IMMEL.